(12) United States Patent
Staneff

(10) Patent No.: US 7,698,603 B2
(45) Date of Patent: Apr. 13, 2010

(54) TEST RESULTS MANAGEMENT

(75) Inventor: Geoffrey D Staneff, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 11/852,150

(22) Filed: Sep. 7, 2007

(65) Prior Publication Data

US 2009/0070633 A1  Mar. 12, 2009

(51) Int. Cl.
*G06F 11/00* (2006.01)
(52) U.S. Cl. .......................................... 714/45
(58) Field of Classification Search ................... 714/18, 714/21, 25, 27, 31, 37, 38, 45–47
See application file for complete search history.

(56) References Cited

U.S. PATENT DOCUMENTS

| 5,021,997 | A | | 6/1991 | Archie et al. |
| 5,513,315 | A | | 4/1996 | Tierney et al. |
| 5,566,330 | A | * | 10/1996 | Sheffield ........................ 707/4 |
| 5,574,854 | A | * | 11/1996 | Blake et al. .................... 714/28 |
| 5,604,895 | A | * | 2/1997 | Raimi ........................... 703/13 |
| 5,671,351 | A | * | 9/1997 | Wild et al. ..................... 714/38 |
| 5,896,495 | A | * | 4/1999 | Stein et al. ..................... 714/38 |
| 6,279,121 | B1 | * | 8/2001 | Gamo ........................... 714/15 |
| 6,662,217 | B1 | * | 12/2003 | Godfrey et al. ............. 709/219 |
| 6,823,478 | B1 | | 11/2004 | Prologo et al. |
| 6,845,471 | B1 | | 1/2005 | Huth |
| 7,146,572 | B2 | | 12/2006 | Richardson |
| 2002/0116153 | A1 | | 8/2002 | Lucile |
| 2002/0199172 | A1 | * | 12/2002 | Bunnell ....................... 717/128 |
| 2004/0153837 | A1 | * | 8/2004 | Preston et al. ................. 714/39 |
| 2006/0230318 | A1 | | 10/2006 | Grey |
| 2006/0294434 | A1 | | 12/2006 | Hideya et al. |
| 2007/0006037 | A1 | | 1/2007 | Sargusingh et al. |
| 2007/0006041 | A1 | | 1/2007 | Brunswig et al. |

OTHER PUBLICATIONS

"Bugbusters", retrieved on May 15, 2007, at <<http://www.dnjonline.com/articles/tools/iss17_tools.html>>, pp. 1-5.
"LanLicenser 4.0", ABC Enterprises, 2006, pp. 1-8.
Rankin, "The Software Testing Automation Framework", retrieved at <<http://researchweb.watson.ibm.com/journal/sj/411/rankin.html>>, vol. 41, No. 1, 2002, IBM, pp. 1-13.
Isenberg, "The Practical Organization of Automated Software Testing", retrieved on May 15, 2007, at <<http://www.automated-testing.com/PATfinal.htm>>, pp. 1-9.

* cited by examiner

*Primary Examiner*—Nadeem Iqbal

(57) ABSTRACT

Systems and methods of providing test result management are disclosed herein. A first configuring command to trace a test event data stream can be received. The test event data stream comprises test messages produced from execution of a test application. A second configuring command to trace a debug event data stream can be received. The debug event data stream includes debugging messages produced from execution of a tested application. A third configuring command to trace an execution event data stream can be received. The execution event data stream includes function invocation messages produced from execution of the tested application. The test event data stream, the debug event data stream, and the execution event data stream can be received and interleafed into a collated data stream log.

14 Claims, 4 Drawing Sheets

TEST RESULTS MANAGEMENT

BACKGROUND

As computer systems become more complex, testing of newly developed code, or introduced fixes to computer code, must be tested accurately, with sufficient coverage, and efficiently. Test result management is generally left to the individual tester's discretion, thus allowing the tester to implement tester-specific tracking of information about the test process. Software test coverage of a multi-component and multi-tester scenario is complex.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various techniques to management of outputting and logging test results. A consuming platform can receive event data from a producing platform. The event data can include test event data streams, debug event data streams, and execution event data streams. These streams can be collated into a single a collated data stream log. Therefore, the system described herein produces result archives that are naturally searchable and filterable. These results are comparable, and contain context information necessary for cross test pass comparisons as well as comparisons within a single test pass. The system allows for data collection from a variety of sources and provides a means to associate these disparate data sources in a coherent presentation of status for a specific test or operation.

Many of the attendant features will be more readily appreciated as the same become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a distributed debugging system for a visual programming language, the system described is provided as an example and not a limitation. As those skilled in the art will appreciate, the present examples are suitable for application in a variety of different types of distributed debugging system for a visual programming language.

The system disclosed herein permits any testing entity such as an administrator or user of a system to configure the production and consumption of testing logs. As such, the system permits the management of event data stream collection and collation. As such, data from various event data streams can be collated a variety of data sources for a specific test within a single logger. Conventional systems only provide logging for a single event data stream. The system and method provided herein permit event logging that includes with debug and operational tracing from the product code under test and correlated with the test being executed. These different sources of information can be effectively utilized by the ability to filter the logs collected for any given test. This allows for discovery of trends or other critical information.

Figure 1:
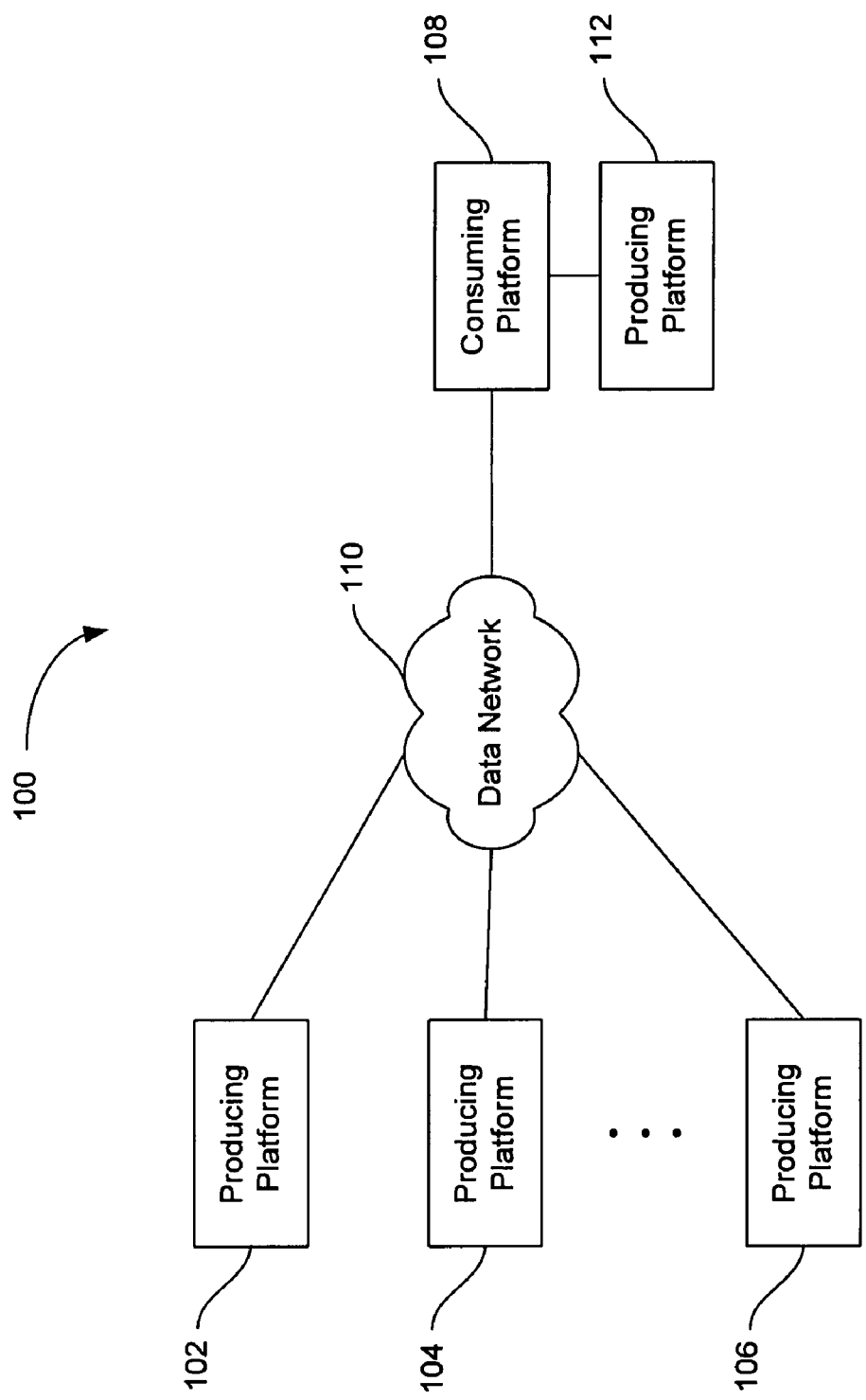
FIG. 1 illustrates a component diagram of a system for providing test result management according to one embodiment.

FIG. 1 illustrates a component diagram of a system for providing test result management according to one embodiment. In the system 100, a consuming platform 108 can be a computing device, or a computing module in a computing device, configured to receive event data streams from various producing platforms. In one example, producing platforms 102, 104 and 106 can be remote computing devices or modules that transmit event data streams to the consuming platform 108. Such event data streams can be transmitted over a data network 110, such as the Internet or an intranet. In another example, the producing platform 112 can be a computing device or computing module that is directly connected to the consuming platform 108. For instance, the producing platform 112 can be connected to the consuming platform 108 via a direct cable connection. In another embodiment, the producing platform 112 and the consumer platform 108 can be computing software modules operating in the same computing device.

In one embodiment, the producing platforms 102, 104 and 106 are configured to execute the testing of an application and produce event data streams out of the testing of the application. Such data streams can then be provided to the consuming platform 108 on the form of a log file, or via a real-time stream, etc. The consuming platform 108 can be configured to receive, read and interpret event data streams. Moreover, the consuming platform 108 can be configured to retrieve events from even data stream such as an event channel, an event log file, a trace file, or a real-time session.

Figure 2:
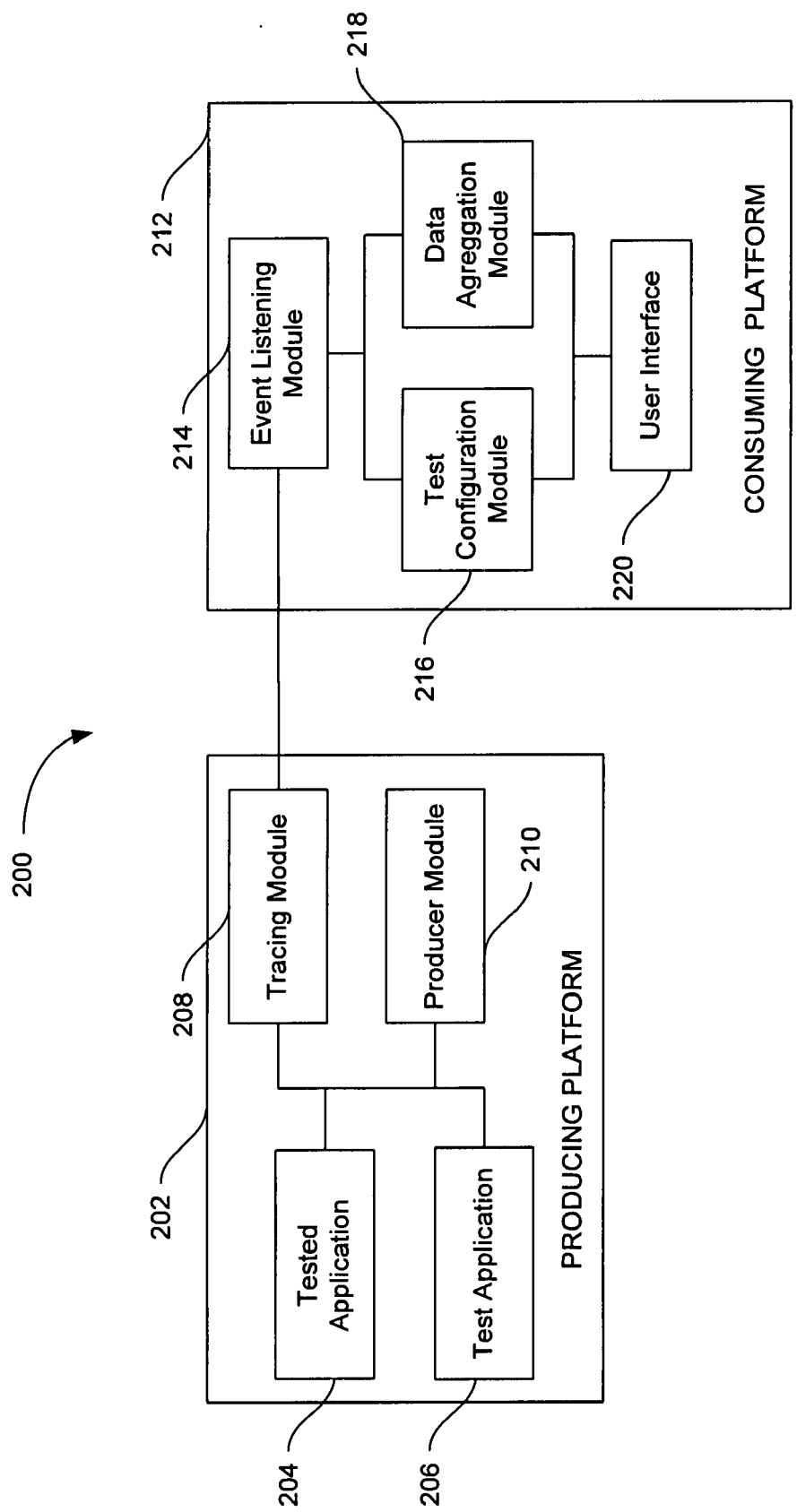
FIG. 2 illustrates a component diagram of a producing platform and a consuming platform according to one embodiment.

FIG. 2 illustrates a component diagram of a producing platform and a consuming platform according to one embodiment. The producing platform 212 can include a tested application 204, a test application 206, and a producer module 206. The tested application 204 can be any application or computing component being tested and executed at the producing platform 212. The test application 206 can be any application configured to test one or more features and scenarios in the functionality of the tested application 204. As such, the test application 206 can be a specialized application developed to create test scenarios, provide input to the tested application 204.

The test application 206 can interact with a producer module 210 to create an event data stream. The producer module 210 can be configured according to user configuration entered at the user interface 220. The user can submit configurations to identify which application logs to listen to during test execution. The producer module 210 can provide the ability to log status and user defined information. For example, upon execution of the test application 206 and the occurrence of an event, the producer module 210 can collect any output data from the test application 206 and filter and format the output data to create event data streams. An event can be produced by the producer module 210 in the form of a data structure. For example, an event can include one or more blocks of data that include header, body, checksum information, time stamps, and the like. As such, the producer module 210 can produce a test event data stream. The test event data stream can comprise test messages produced from execution of a test application.

Furthermore, a tracing module 208 can be included in the producing platform. The tracing module can be configured with logic to receive test event data stream and other event data streams from the tested application 204. In one example, the tracing module 208 can be configured to receive debug event data streams. A debug event data stream can include debugging messages produced from execution of a tested application. These messages can include error messages, comment messages, and any other output programmed as part of the tested application 204. In another example, the tracing module 208 can be configured to receive an execution event data stream. The execution event data stream can include function invocation messages produced from execution of the tested application. Function invocation messages can include the name of the method, procedure, or function called, the parameters used, return values, etc.

Furthermore, the tracing module 208 can be configured to receive event data stream from other applications running on the reducing platform 202. As such the tracing module 208 can provides application programmers the ability to start and stop event tracing sessions. Thus, event tracing can be enabled or disabled dynamically thus making it possible to perform detailed tracing in a production environment without requiring computer or application restarts. Therefore, the tracing module can be configured to communicate with the kernel of the producing platform 202. In one example, the tracing module can create a handle and specify that the kernel take events delivered to that handle and save them to a file.

In another embodiment, a consuming platform 202 can include an event listening module 214, a test configuration module 216, a data aggregation module 218, and a user interface 220. The event listening module 214 can be configured to listens to event source streams according to a request of the listening configuration module. The event listening module 214 can store events in event logs, and render events source streams when requested. The event listening module 214 renders event source streams according to configuration provided at the test configuration module 216.

The test configuration module 216 subscribes to the producer module 210 and to other application event data stream produced at the tracing module 2108. Thus, the test configuration module 216 may designate the application under test in order to collect debug and system execution tracing (as available) from the product code during the execution of that test. The test configuration module 216 can also be configured to subscribe to the debug event data stream of the tested application 204, and to the execution event data stream of the tested application 204.

Therefore, the test configuration module 216 can receive, from user input entered at the user interface 220, a configuring command to trace a test event data stream, the debug event data stream, and the execution event data stream. The test event data stream can include test messages produced from execution of a test application. The debug event data stream can include debugging messages produced from execution of a tested application. The execution event data stream can include function invocation messages produced from execution of the tested application.

The received streams can be processed at a data aggregation module 218. The data aggregation module 218 can monitor test execution and collates and filters logs generated by the different sources either from the same or a remote machine. As such, the data aggregation module 218 can receive the test event data stream, the debug event data stream, and the execution event data stream. The data aggregation module 218 can be configured to interleaf the test event data stream, the debug event data stream, and the execution event data stream into a collated data stream log.

Therefore, the data aggregation module 218 associates the data collected from different sources to allow analysis of the system under test that includes a variety of sources and perspectives. For example, this application can be configured to interleaf the test event data stream, the debug event data stream, and the execution event data stream. One or more known mechanisms of interleafing can be utilized. For example, the logs can be interleafed chronologically, such that the final collated data stream log includes entries that are ordered using their timestamps. This permits a systemic analysis that shows various events and/or messages of events that are correlated and make debugging more efficient and clear.

In addition, a user interface 220 can be included to permit a user, such as a tester, to interact with the results of a test execution and configuring the listeners. The tester can specify which application's analytic, debug, operational and other channels to listen to. Thus the tester can specify events or information sources to either include or exclude from the result.

This interface allows the user to configure subscriptions to events on remote machines in order to track when a test pass has started, completed, and when results are ready for analysis.

Figure 3:
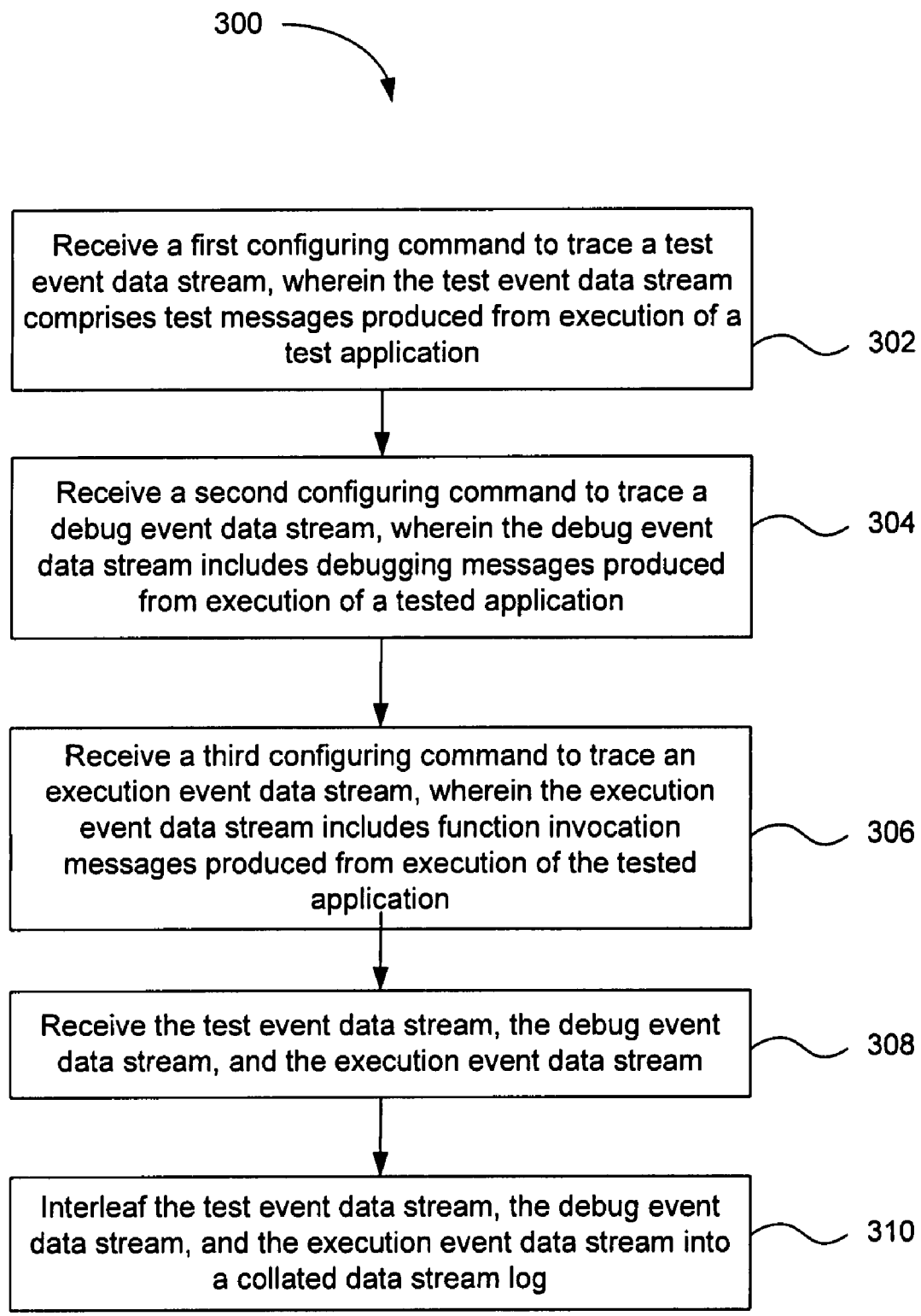
FIG. 3 illustrates a flow diagram of a process for test result management according to one embodiment.

FIG. 3 illustrates a flow diagram of a process for test result management according to one embodiment. At process block 302, a first configuring command can be configured to trace a test event data stream. The test event data stream comprises test messages produced from execution of a test application. Process 300 continues at process block 304.

At process block 304, a second configuring command to trace a debug event data stream can be received. The debug event data stream includes debugging messages produced from execution of a tested application. Process 300 continues at process block 306.

At process block 306, a third configuring command to trace an execution event data stream can be received. The execution event data stream includes function invocation messages produced from execution of the tested application. The first, second, and third configuring commands can be entered and process in various ways. For example, such commands can be entered by a user via the user interface 220. Process 300 continues at process block 308.

At process block 308, the test event data stream, the debug event data stream, and the execution event data stream can be received. Process 300 continues at process block 310. At process block 310, the test event data stream, the debug event data stream, and the execution event data stream are interleaved into a collated data stream log.

Figure 4:
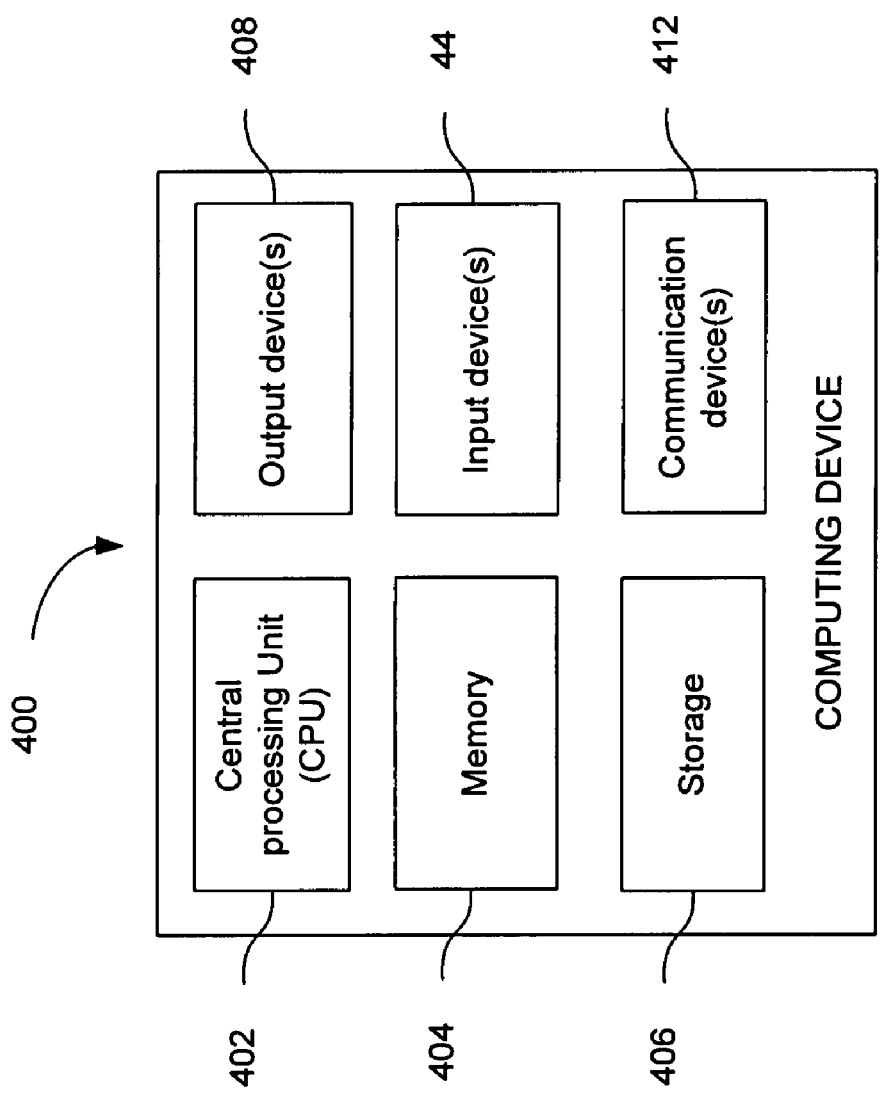
FIG. 4 illustrates a component diagram of a computing device for implementing one or more embodiments.

FIG. 4 illustrates a component diagram of a computing device according to one embodiment. The computing device 400 can be utilized to implement one or more computing devices, computer processes, or software modules described herein. In one example, the computing device 400 can be utilized to process calculations, execute instructions, receive and transmit digital signals. In another example, the computing device 400 can be utilized to process calculations, execute instructions, receive and transmit digital signals, receive and transmit search queries, and hypertext, compile computer code, as required by the tested application 204, the test application 206, the tracing module 208, the producing module 210, the event listening module 214, the test configuration module 216, the data aggregation module 216, and the user interface 220.

The computing device 400 can be any general or special purpose computer now known or to become known capable of performing the steps and/or performing the functions described herein, either in software, hardware, firmware, or a combination thereof.

In its most basic configuration, computing device 400 typically includes at least one central processing unit (CPU) 402 and memory 404. Depending on the exact configuration and type of computing device, memory 404 may be volatile (such as RAM), non-volatile (such as ROM, flash memory, etc.) or some combination of the two. Additionally, computing device 400 may also have additional features/functionality. For example, computing device 400 may include multiple CPU's. The described methods may be executed in any manner by any processing unit in computing device 400. For example, the described process may be executed by both multiple CPU's in parallel.

Computing device 400 may also include additional storage (removable and/or non-removable) including, but not limited to, magnetic or optical disks or tape. Computer storage media includes volatile and nonvolatile, removable and non-removable media implemented in any method or technology for storage of information such as computer readable instructions, data structures, program modules or other data. Memory 404 and storage 406 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 400. Any such computer storage media may be part of computing device 400.

Computing device 400 may also contain communications device(s) 412 that allow the device to communicate with other devices. Communications device(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 400 may also have input device(s) 410 such as keyboard, mouse, pen, voice input device, touch input device, etc. Output device(s) 408 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of logging test results, comprising:
receiving a first configuring command to trace a test event data stream, wherein the test event data stream comprises test messages produced from execution of a test application;
receiving a second configuring command to trace a debug event data stream, wherein the debug event data stream includes debugging messages produced from execution of a tested application;
receiving a third configuring command to trace an execution event data stream, wherein the execution event data stream includes function invocation messages produced from execution of the tested application;
receiving the test event data stream, the debug event data stream, and the execution event data stream; and
interleafing the test event data stream, the debug event data stream, and the execution event data stream into a collated data stream log.

2. The method of claim 1, wherein the test event data stream is received from one or more producing platforms at a consuming platform via a data network.

3. The method of claim 1, wherein the first configuring command is received from a user interface at a consuming platform.

4. The method of claim 1, further comprising recording the collated data stream log on an output file.

5. The method of claim 1, wherein the test event data stream, the debug event data stream, and the execution event data stream are interleafed in chronological order.

6. The method of claim 1, wherein the test event data stream, the debug event data stream, and the execution event data stream are interleafed on a per event basis.

7. The method of claim 1, wherein the test application interacts with a producing module in order to create the test event data stream.

8. A system of logging test results, comprising:
a test configuration module that receives a configuring command to trace a test event data stream, wherein the test event data stream comprises test messages produced from execution of a test application, the test configuration module configured to receive a configuring command to trace a debug event data stream, wherein the debug event data stream includes debugging messages produced from execution of a tested application, the test configuration module further configured to receive a configuring command to trace an execution event data stream, wherein the execution event data stream includes function invocation messages produced from execution of the tested application; and a data aggregation module that receives the test event data stream, the debug event data stream, and the execution event data stream, the data aggregation module configured to interleaf the test event data stream, the debug event data stream, and the execution event data stream into a collated data stream log.

9. The system of claim 8, wherein the test event data stream is received from one or more producing platforms at a consuming platform via a data network.

10. The system of claim 8, wherein the first configuring command is received from a user interface at a consuming platform.

11. The system of claim 8, wherein the data aggregation module is configured to record the collated data stream log on an output file.

12. The system of claim 8, wherein the test event data stream, the debug event data stream, and the execution event data stream are interleafed in chronological order.

13. The system of claim 8, wherein the test event data stream, the debug event data stream, and the execution event data stream are interleafed on a per event basis.

14. The system of claim 8, wherein the test application interacts with a producing module in order to create the test event data stream.

* * * * *